(12) United States Patent
Yermakov

(10) Patent No.: US 10,742,672 B2
(45) Date of Patent: Aug. 11, 2020

(54) COMPARING METRICS FROM DIFFERENT DATA FLOWS TO DETECT FLAWS IN NETWORK DATA COLLECTION FOR ANOMALY DETECTION

(71) Applicant: Level 3 Communications, LLC, Broomfield, CO (US)

(72) Inventor: Sergey Yermakov, Littleton, CO (US)

(73) Assignee: Level 3 Communication, LLC, Broomfield, CO (US)

(*) Notice: Subject to any disclaimer, the term of this patent is extended or adjusted under 35 U.S.C. 154(b) by 128 days.

(21) Appl. No.: 15/477,910

(22) Filed: Apr. 3, 2017

(65) Prior Publication Data
US 2018/0288083 A1    Oct. 4, 2018

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *H04L 12/26* | (2006.01) |
| *H04L 12/24* | (2006.01) |

(52) U.S. Cl.
CPC .......... *H04L 63/1425* (2013.01); *H04L 43/02* (2013.01); *H04L 43/04* (2013.01); *H04L 43/0817* (2013.01); *H04L 41/0213* (2013.01); *H04L 63/1458* (2013.01)

(58) Field of Classification Search
CPC . H04L 63/1425; H04L 41/0213; H04L 43/04; H04L 63/1458; H04L 43/0817; H04L 43/02
See application file for complete search history.

(56) References Cited

U.S. PATENT DOCUMENTS

| | | | |
|---|---|---|---|
| 8,185,619 B1* | 5/2012 | Maiocco | H04L 12/6418 709/203 |
| 2015/0007314 A1* | 1/2015 | Vaughan | H04L 63/1441 726/23 |
| 2017/0265232 A1* | 9/2017 | Miyata | H04W 4/80 |
| 2018/0026993 A1* | 1/2018 | Parla | H04L 63/1425 726/23 |
| 2018/0270132 A1* | 9/2018 | Hashimoto | H04L 43/0823 |
| 2018/0288082 A1* | 10/2018 | Pope | H04L 63/20 |

* cited by examiner

*Primary Examiner* — Trong H Nguyen
*Assistant Examiner* — Amie C. Lin

(57) ABSTRACT

In an embodiment, a computer-implemented method compares metrics from different data flows to detect flaws in collection of data describing operation of a network. The method uses a first network data collection technique to collect a first metric describing a characteristic of a network interface. Using a second network data collection technique different from the first network data collection technique, a second metric describing the characteristic of the network interface is collected. The first metric is compared with the second metric to determine whether the first and second metrics are incongruous. When the first and second metrics are determined to be incongruous, a flaw is detected to exist in the first or second network data collection techniques.

18 Claims, 5 Drawing Sheets

400

| $X_{util-tx}$ | | | | |
|---|---|---|---|---|
| | | Circuit #1 | Circuit #2 | Circuit #3 |
| $X_{nflow}$ | Circuit #1 | SDev=21.27; M=7.87 | SDev=77.30; M=42.63 | SDev=0.48; M=0.38 |
| | Circuit #2 | SDev=467.71; M=132.567 | SDev=106.64; M=23.51 | SDev=0.75; M=0.37 |
| | Circuit #3 | SDev=1135.42; M=824.231 | SDev=367.68; M=368.03 | SDev=0.75; M=3.24 |

| $X_{util-tx}$ | | | | |
|---|---|---|---|---|
| | | Circuit #1 | Circuit #2 | Circuit #3 |
| $X_{nflow}$ | Circuit #1 | rho=0.75462 | rho=0.16 | rho=0.72 |
| | Circuit #2 | rho=0.15 | rho=0.46 | rho=0.03 |
| | Circuit #3 | rho=0.71 | rho=0.11 | rho=0.84 |

FIG. 4B

COMPARING METRICS FROM DIFFERENT DATA FLOWS TO DETECT FLAWS IN NETWORK DATA COLLECTION FOR ANOMALY DETECTION

BACKGROUND

Field

This field generally relates to detecting flaws in network data collection and to providing clean data to anomaly detection systems.

Related Art

A communication network may, for example, provide a network connection that allows data to be transferred between two geographically remote locations. A network may include network elements connected by links. The network elements may be any type of managed device on the network, including routers, access servers, switches, bridges, hubs, IP telephones, IP video cameras, computer hosts, and printers. Network elements can be physical or logical and can communicate with one another via interconnected links.

Subscribers may purchase services to be provided by the communication network. The services may provide network connectivity between different edge routers on the communication network. One example of a network connectivity service is an E-Line. E-Line is a data service defined by the Metro Ethernet Forum, providing a point-to-point Ethernet connection between a pair of user network interfaces.

Network anomalies occur on a network that can impair service. Anomalies may also be caused by network component failures or bottlenecks caused by a spike in legitimate utilization.

A network anomaly may, for example, be an abuse. Abuse can come in several forms. For example, some abuse mechanisms try to overwhelm a service so that it cannot service legitimate requests. These are referred to as denial of service requests, whether at the network or application layer. One common mechanism of abuse is referred to as application abuse. An example of this is a malicious entity fraudulently creating accounts on an application platform and subsequently transporting illegitimate traffic through the network environment. Another type of denial of service abuse is a Transport Control Protocol (TCP) SYN flood abuse. Other abuses involve viruses, unauthorized intrusion, or spyware.

To try to detect these anomalies, data is collected from the network. Networks may also provide clients with statistics, reports, and other information related to their elements and their performance. For example, clients may wish to see how much their traffic is delayed by the network, whether the service is meeting service level agreements, whether the network is causing a bottleneck, etc.

To collect metrics, a standard protocol, such as Simple Network Management Protocol (SNMP), may be used. SNMP is part of the Internet Protocol Suite as defined by the Internet Engineering Task Force (IETF). It includes a set of standards for network management, including an application layer protocol, a database schema, and a set of data objects.

In addition to SNMP, netflow data may be used. Netflow data, as the term is used herein, is not limited to data from a particular brand or type of router. The netflow data may include a record for each data flow. Each data flow may be one or more packets in time proximity with one another having a common protocol identified via Internet Protocol (IP) addresses and Transport Control Protocol (TCP) or User Datagram Protocol (UDP) ports. When a certain amount of time passes after receipt of a packet having these characteristics, the network device determines that the flow has ended, and if the network device receives any additional packets with these characteristics, the network device regards the packets as belonging to a new data flow and represents them with a new netflow data record. Each netflow record may include the data flow's (1) source and destination IP address, (2) source port and destination UDP or TCP port, (3) type of protocol, and (4) start and end times. In this way, netflow data summarizes certain characteristics of a data flow.

Network operational flaws can cause the network metrics to be incorrectly analyzed or interpreted. Network operation may be impaired for different reasons. For example, component failure, including link failures or network element failure, may cause operational flaws in the network. Network operational flaws may also be caused by misconfiguration, malfunction of network elements, or congestion in the network.

New systems and methods are needed to detect these network flaws.

BRIEF SUMMARY

In an embodiment, a computer-implemented method compares metrics from different data flows to detect flaws in collection of data describing operation of a network. The method uses a first network data collection technique to collect a first metric describing a characteristic of a network interface. Using a second network data collection technique different from the first network data collection technique, a second metric describing the characteristic of the network interface is collected. The first metric is compared with the second metric to determine whether the first and second metrics are incongruous. When the first and second metrics are determined to be incongruous, a flaw is detected to exist in the first or second network data collection techniques.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 4A-B illustrate different methods for comparing network metrics collected using different techniques, according to embodiments.

The drawing in which an element first appears is typically indicated by the leftmost digit or digits in the corresponding reference number. In the drawings, like reference numbers may indicate identical or functionally similar elements.

DETAILED DESCRIPTION

As indicated above, network metrics are collected from a variety of sources and for a variety of purposes. Because the metrics are collected using different techniques, even when properly working and configured, they may not match up precisely even when they may correspond to the same characteristic of the same circuit.

For example, when SNMP ingress or egress data is collected for a particular time period on a particular circuit, that metric may provide information describing the utilization of that circuit during that time. However, when netflow data is measured in the same time period, the resulting utilization data may differ, because netflow may sample packets, as opposed to measuring all data flowing through the circuit. Also the timing of when the SNMP data and netflow data are collected may not line up precisely. Thus, when collecting network metrics describing the same network attribute using two different techniques, the net metrics collected using two different techniques may be roughly correlated, but may not precisely match, even when the network is properly configured and free from flaws.

Sometimes networks are not configured properly, and sometimes flaws occur. For example, a network may have a provisioning system separate from the underlying network elements. The provisioning system may map interfaces on network elements, such as edge routers, to particular subscribers and their purchased network connectivity services. Sometimes errors can occur in this mapping. Errors can be caused, for example, through operator error. For example, an operator may forget to clean up configuration information when a subscriber moves to a new device. In addition, errors can be caused by processes that automatically discover new devices.

Often times networks comprise hybrids of different legacy networks that were created at different times and by different outside vendors to provide underlying network services. These underlying legacy and vendor networks may differ in how they collect and process data. These differences can also create errors in the way the network is configured.

These configuration errors can cause network metrics collected through different techniques to become incongruous. Embodiments relate to determining when these network metrics are incongruous to detect a possible flaw in the network's configuration. Embodiments allow flaws to be detected before they are passed on to, for example, the anomaly detection system or to a monitoring interface.

Figure 1:
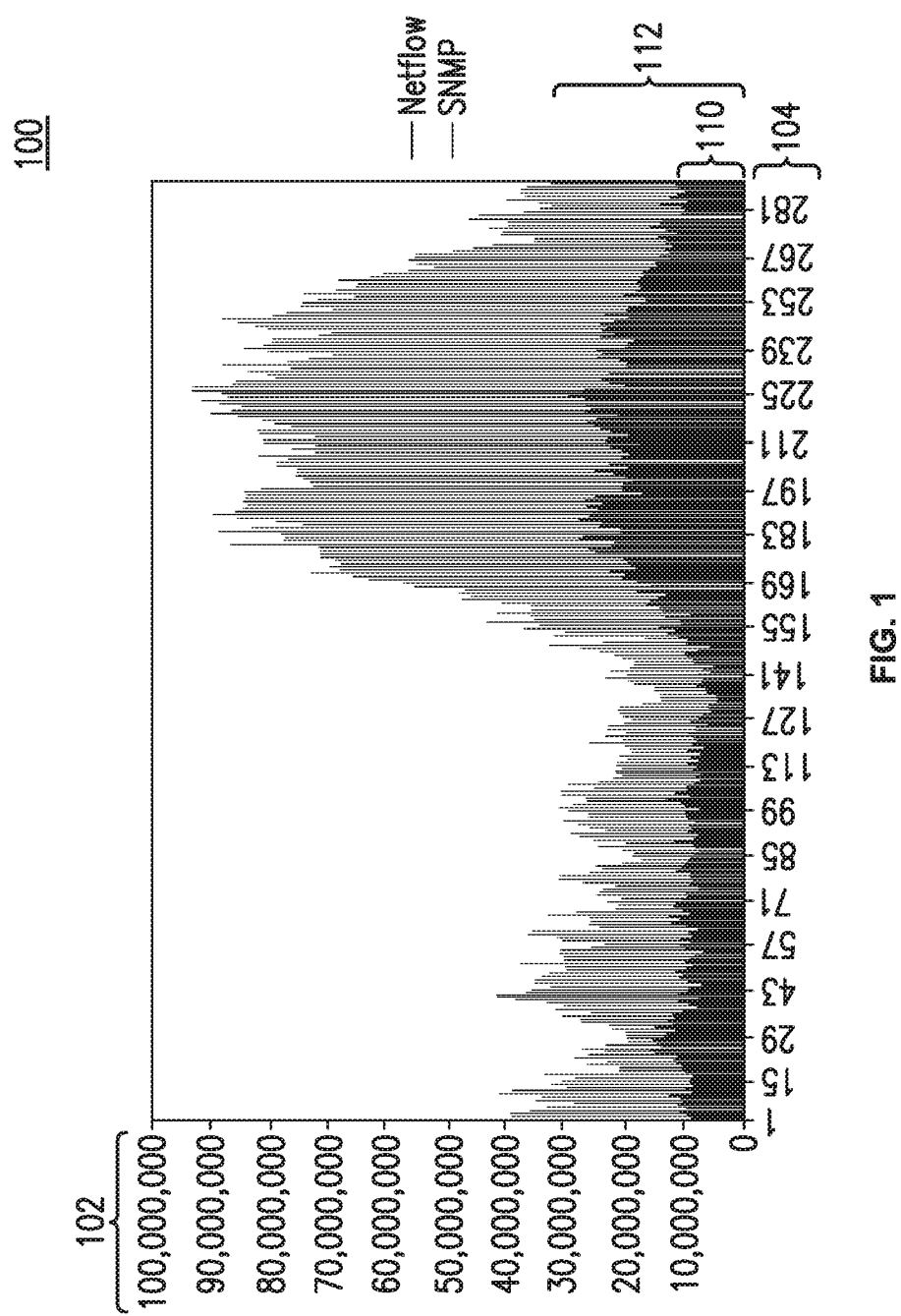
FIG. 1 is a chart illustrating network data collected using two different techniques over time.

FIG. 1 shows a chart 100 illustrating utilization data collected using two different techniques over time. Chart 100 has to axes: a time axis 104 and a utilization axis 102.

The utilization data collected is for a particular circuit or network conductivity service. For example, the data may be utilization data collected for a particular port for a particular edge router. That port may correspond to a subscriber circuit.

Chart 100 illustrates on axis 102 the amount of data received on the port during a corresponding time on axis 104. In particular, chart 100 illustrates two data sets. It illustrates utilization data collected from a first technique, netflow, as a data set 110, and utilization data collected from a second technique, SNMP ingress or egress, as a data set 112. Each time interval on time axis 104 may, for example, be an interval such as a five-minute interval or bucket, and the data point illustrated on axis 102 may be the amount of data measured during that time period by the respective techniques.

Chart 100 shows that, while data set 112 records greater utilization than data set 110, data set 112 and data set 110 are congruent. As indicated above, data set 110 reflects sampled netflow data while data set 112 reflects aggregate SNMP egress or ingress data. Because the different collection techniques reflect aggregate versus sample data, the aggregate data—data set 112—will result in greater readings than the sampled data—data set 110. That said, they roughly correlate with one another.

If two data sets of metrics (110 and 112) collected for the same circuit were incongruous, in that they did not correlate with one another, that lack of correlation may indicate a flaw in the network configuration. For example, the mapping between the ports on the routers and the subscriber service may be incorrect. If such a flaw is detected, the data may not be sent along to an anomaly detection system, because the data may be faulty. An operator may be alerted to investigate the potential configuration error.

Figure 2:
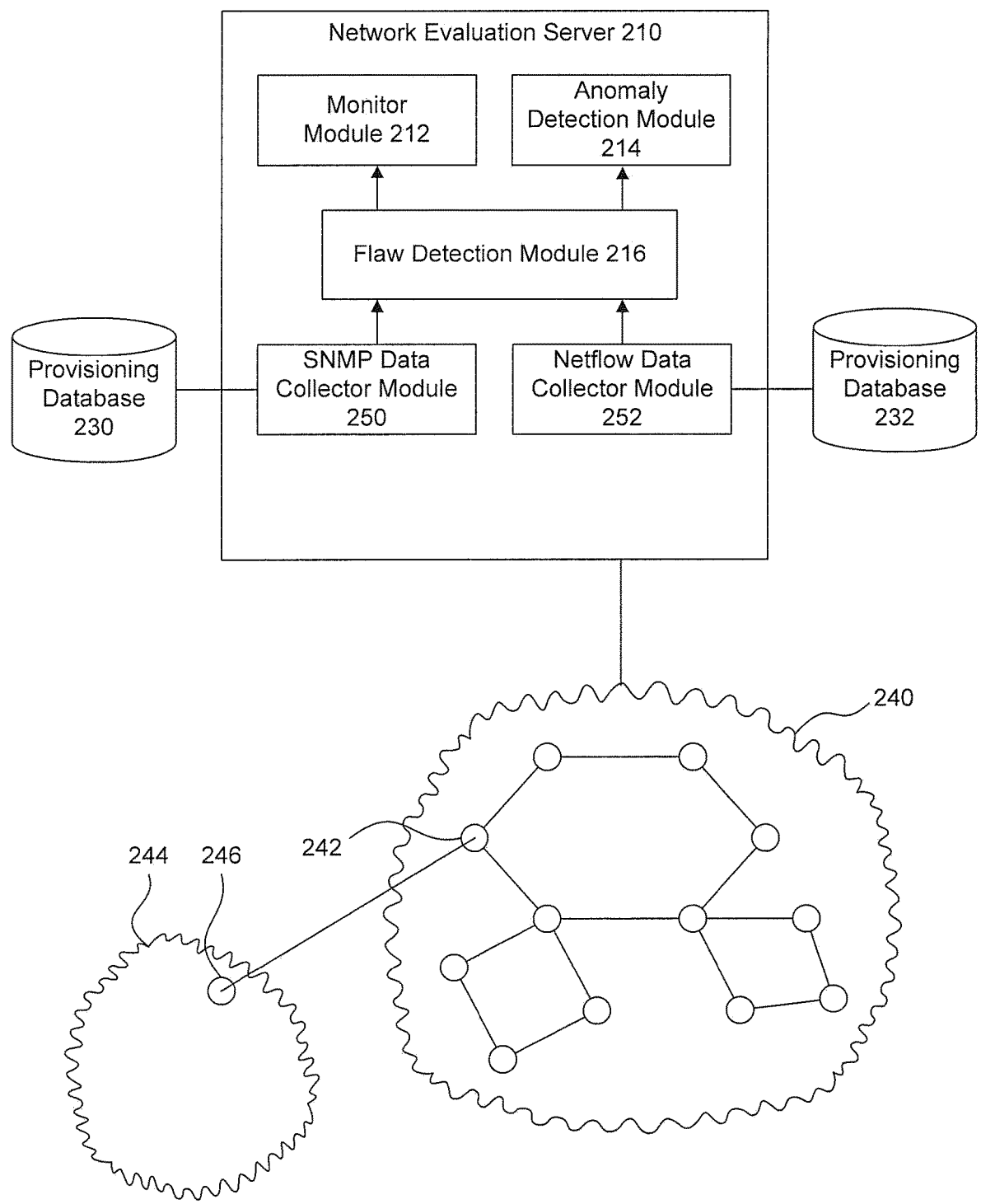
FIG. 2 is a diagram illustrating a system for collecting network metrics and correlating them to detect flaws in the network, according to an embodiment.

FIG. 2 is a diagram illustrating a system 200 for collecting network metrics and correlating them to detect flaws in the network, according to an embodiment. System 200 includes a network evaluation server 210, provisioning databases 230 and 232, a service provider network 240, and a subscriber network 244.

Service provider network 240 includes a plurality of network elements, including a network element 242. Network element 242 may be a switching device, such as a switch (operating at open systems interconnection (OSI) model data link layer 2) or router (operating at OSI network layer 3).

Network element 242 may be an edge switching device. An edge switching device may be a device that connects directly to a subscriber network. As shown in system 200, network element 242 connects directly to a network element 246, which is on subscriber network 244. Network element 242 may connect directly to network element 246 via a physical port on network element 242. The port receives data from subscriber network 244 addressed to devices accessible from service provider network 240 and transmits data from service provider network 240 to network devices on subscriber network 244.

Network evaluation server 210 collects data describing operation of service provider network 240, screens the data for potential network flaws, and analyzes the screened data. The data is collected using a variety of different techniques, each with a different data collector module. Two data collector modules are shown in system 200: SNMP data collector module 250 and netflow data collector module 252.

SNMP data collector module 250 may use an SNMP Get message to query for particular metrics from service provider network 240. The metrics relate to particular objects on the network. The objects may be specified using object identifiers (OIDs). Each OID may be a sequence of integers separated by decimal points. An example of an OID is 1.3.6.1.2.1.2.2.1. Each OID may have a textual description as well. For example the textual description of 1.3.6.1.2.1.2.2.1 may be iso.org.dod.internet.mgmt.mib-2.interfaces.ifTable.ifEntry, which may represent the interfaces on a network element. That object may have a plurality of tuples, each tuple representing an interface and including its own OID. For example, 1.3.6.1.2.1.2.2.1.1 may be iso.org.dod.internet.mgmt.mib-2.interfaces.ifTable.ifEntry.ifIndex, which is a unique value for each interface. And 1.3.6.1.2.1.2.2.1.10 and 1.3.6.1.2.1.2.2.1.16 may be iso.org- .dod.intermet.mgmt.mib-2.interfaces.ifTable.ifInOctets and iso.org.dod.intermet.mgmt.mib-2.interfaces.ifTable.ifOutOctets, which represent the number of inbound and outbound octets (bytes) respectively on the interface. Objects can have instances. When the objects are stored in a treelike hierarchy, the instances may be all of the object's children. They may, for example, be an entire subtree with the object specified by an object identifier as its root. The object instances may also have an object ID. For example, the object instances may have the object's ID, appended with a new suffix.

Examples for performance metrics collected by SNMP data collector module 250 may include passive metrics such as InOctets or OutOctets provided by a network switch. Other examples of performance metrics may include active metrics such as round trip time (RTT), latency, or jitter of traffic on a service provided by the network. For example, a tuple may be {Switch Port MAC address, Performance Metric, Instance Identifier}.

SNMP data collector module 250 is coupled to provisioning database 230. Provisioning database 230 may map a particular port of a network elements in service provider network 240 to a network connectivity service provided to the subscriber. For example, provisioning database 230 may map a switch port MAC address or an SNMP object to the network connectivity service. SNMP data collector module 250 accesses provisioning database 230 to identify a network conductivity service that corresponds to a metric. Then, SNMP data collector module 250 may provide the metrics and corresponding network connectivity service to flaw detection module 216.

Flaw detection module 216 also receives metrics for the network conductivity service from netflow data collector module 252. Each netflow record may include the data flow's (1) source and destination IP address, (2) source port and destination UDP or TCP port, (3) type of protocol, (4) start and end times. In addition, a network flow can include the ingress interface (SNMP ifIndex). Netflow records may observe in number packets observed in the flow, a number of bytes observed in the flow, data flow start time and duration.

While netflow may provide the capability to process all IP packets on an interface, in some environments, such as Internet backbones, processing all packets may be too costly, due to extra processing required for each packet and the large number of simultaneous flows. So, in those environments, the network devices may sample incoming packets to determine which flows they correspond to. The sampling may involve sampling one out of every nth packet. The sampling may be deterministic, sampling every nth packet, or random, randomly selecting one out of every nth packet. The sampling may be on all data on the interface, or the sampling may be per-flow basis. The sampling may be adjusted based on traffic volume. For example, when faced with greater traffic, packets may be sampled less frequently to reduce processing burdens on the network element. A network element may record a netflow record when the flow is completed, for example when an amount of time has elapsed since last receiving a packet with that flow.

Netflow data collector module 252 may send messages to network elements and service provider network 240 to retrieve netflow data. Netflow data collector module 252 may aggregate netflow data to determine corresponding utilization on a particular interface during a particular time.

Netflow data collector module 252 is coupled to provisioning database 232. Provisioning database 232 may map a particular port of a network element in service provider network 240 to a network connectivity service provided to the subscriber. For example, provisioning database 232 may map an IP address or a Netflow record to the network connectivity service. Netflow data collector module 250 accesses provisioning database 252 to identify a network conductivity service that corresponds to a metric. Then, netflow data collector module 252 may provide the metrics and corresponding network connectivity service to flaw detection module 216.

Flaw detection module 216 compares the metrics received from netflow data collector module 252 with the metrics received from SNMP data collector module 250 to determine whether the metrics are incongruous. For example, flaw detection module 216 may determine whether the metrics correlate with one another. If provisioning database 230 and provisioning database 232 are both configured correctly, then the metrics should correlate with one another. If one or both of the two databases is configured incorrectly, then the metrics may not correlate with one other. The lack of correlation indicates that a flaw exists in the network configuration. This is illustrated in FIG. 3B.

Figure 3A:
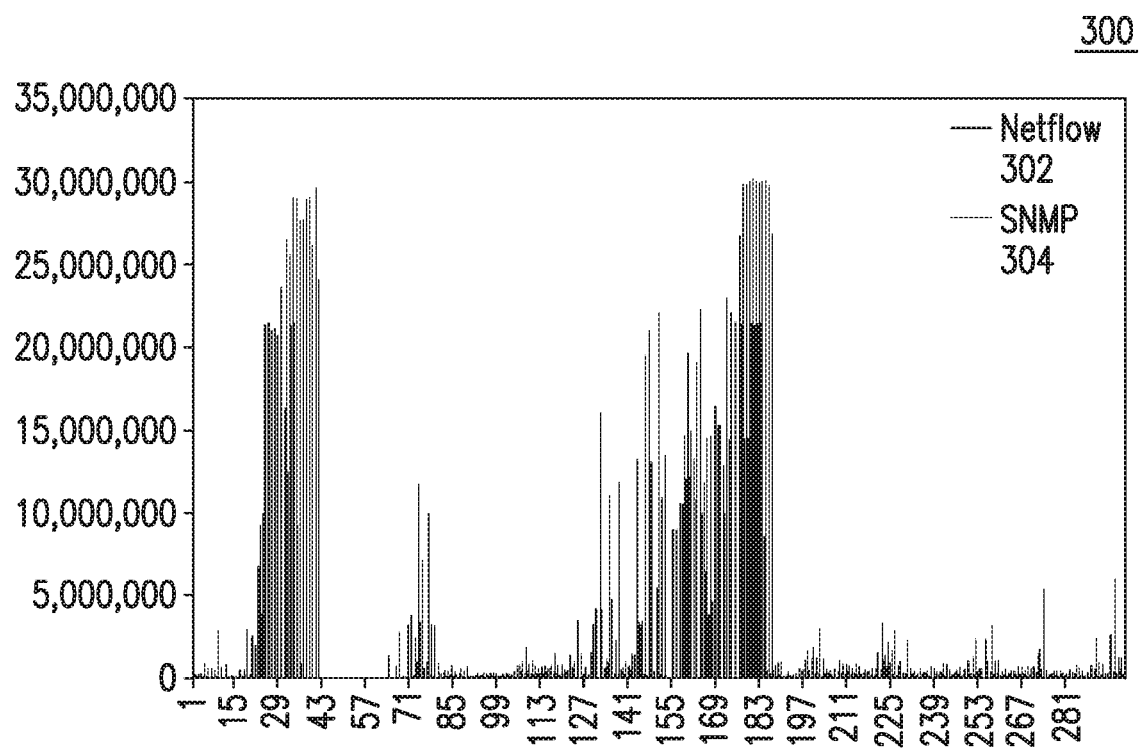
FIGS. 3A-B are additional charts illustrating network data collected using two different techniques over time.
Figure 3B:
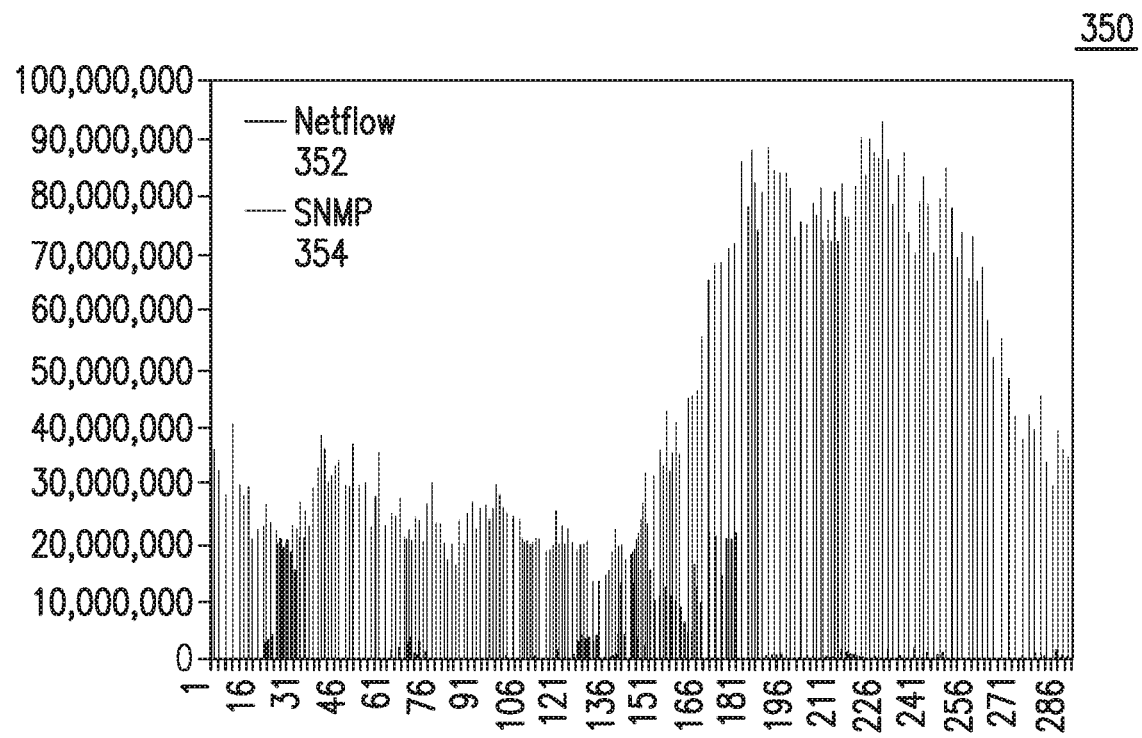

FIGS. 3A-B are additional charts illustrating network data collected using two different techniques over time. FIG. 3A shows a chart 300 that illustrates metrics collected using netflow (302) and SNMP (304). The two data sets are congruent, e.g. correlate with one another, indicating that both data sets correctly reflect the same interface.

FIG. 3B shows a chart 350 that illustrates metrics collected using netflow (352) and SNMP (354). The two data sets are incongruent, e.g. do not correlate with one another, indicating that the data sets do not reflect the same interface. In particular, chart 350 shows the Netflow data from FIG. 3A and the SNMP data from FIG. 1. This indicates that there is a flaw in the network configuration that is falsely mapping two different interfaces to the same network connectivity service.

To determine whether the two sets of metrics are congruent, flaw detection module 216 could use various techniques. Two example techniques are described below with respect to FIGS. 4A-B, according to various embodiments.

FIGS. 4A-B illustrate different methods for comparing network metrics collected using different techniques, according to embodiments. FIG. 4A illustrates a table 400 with values generated by conducting a scaling distribution evaluation between metrics collected from various circuits, and FIG. 4B illustrates a table 450 with a Spearman's rank coefficient metrics collected from various circuits.

In both tables 400 and 450, the columns $X_{until-tx}$ represent SNMP egress data for circuits 1-3, and the rows $X_{nflow}$ represent aggregated netflow data for circuits 1-3. The cells include values generated through the respective techniques, and those values that are underlined are outside acceptable parameters such that when the two data sets are compared they are determined to be incongruent.

First, scaling distribution evaluation is illustrated in table 400 in FIG. 4A. To conduct the scaling distribution evaluation, first, for each time period, flaw detection module 216 determines a ratio between metrics from the datasets. The ratio may be determined as $D_{scaling}=X_{until-tx}/X_{nflow}$, where $X_{until-tx}$ is the received SNMP metric for the time period and $X_{nflow}$ is the received netflow metric for the time period. So, $D_{scaling}$ may be determined for each time period common to the two datasets. The various $D_{scaling}$ for the respective time periods are then aggregated into a single value. The various $D_{scaling}$ values may be aggregated by, for example, determining the mean or median of those values. The aggregation may be determined as M=mean($D_{scaling}$). Aggregated ratios M are illustrated in the cells of table 400.

As mentioned above, because netflow samples packets, while SNMP does not, one would expect the SNMP utilization metrics to be greater than the aggregated netflow utilization metrics. That would result in M being greater than 1. So if M is less than 1, as shown in cells 402 and 404, the data sets corresponding to those cells are determined not to be incongruent and not describe the same circuit. Based on the sampling value, other lower down thresholds may be used. Similarly, given that netflow samples at a fixed rate (for example, nth packet), upper bound thresholds may also be applied. For example, in table 400, the upper bound threshold may be set to 30. The M values in cells 406, 408, 410, and 412 exceed 30. Hence, the corresponding data sets are determined not to be incongruent and not describe the same circuit. The upper and lower thresholds (i.e., the predetermined range) may be selected based on the netflow sampling rates.

In addition to the mean, a variance of the aggregated ratios may be determined. In one embodiment, the variance may be determined using a standard deviation. For example, for the respective time periods, flaw detection module 216 may determine a difference between the respective ratio and the aggregated ratio as N=$D_{scaling}$–M. Then, a standard deviation of those differences may be determined as SDev=stddev(N). The standard deviation is evaluated to determine whether it exceeds a threshold value. In the example in table 400, the threshold value is set to 400. The standard deviation values in cells 410 and 412 exceed 400. Hence, the corresponding data sets are determined not to be incongruent and not describe the same circuit.

Additionally or alternatively, a Spearman's rank coefficient may be determined, as illustrated in table 450 in FIG. 4B. Spearman's rank correlation coefficient or Spearman's rho, is a nonparametric measure of rank correlation (statistical dependence between the ranking of two variables). It assesses how well the relationship between two variables can be described using a monotonic function. The Spearman's rank coefficient may always result in a value between 1 and –1. The closer the Spearman's rank coefficient is to 1 or –1, the stronger the relationship between the two variables. Once a correlation coefficient is determined, it may be assessed to determine whether it is within a predetermined range. If it is within the predetermined range, then the data sets may be determined to be incongruent. Otherwise the data sets may be determined to be congruent.

In the example in table 450, the predetermined range may be between 0 and 0.5. Cells 452, 456, 458, 460, and 462 have values within that range, meaning that the corresponding data sets are determined to be incongruent. Notably, cell 460 represents a false positive in that flaw detection module 216 may recognize the two data sets as being incongruent, when they really both correspond to the same circuit. Similarly, cells 464 and 466 are false negatives in that flaw detection module 216 may recognize their corresponding data sets as congruent when they really correspond to different circuits.

Turning to FIG. 2, flaw detection module 216 may run in realtime or it may be executed periodically or intermittently as part of a routine audit process. When flaw detection module 216 determines two data sets as being incongruent, it may notify a network operator of a potential network configuration flaw. They also prevent the potentially flawed data from being passed on to monitor module 212 or anomaly detection module 214. However, flaw detection module 216 determines two data sets as being congruent, and may provide one or both sets of metrics to monitor module 212 or anomaly detection module 214.

Monitor module 212 may represent a user interface that an operator or a subscriber can access. It may provide utilization information on various network conductivity services over time. Monitor module 212 may, for example, be a web interface that provides its data through a web server.

Anomaly detection module 214 analyzes network data to try to protect the network anomalies, which may be potential security threats. Anomaly detection module 214 may monitor packets on the network and look for patterns in the packets which match a database of signatures representing pre-identified known security threats. Anomaly detection module 214 may generate an alarm if a strange event or trend is detected that could indicate the presence of a threat. To determine whether an anomaly exists, anomaly detection module 214 may evaluate traffic volume, bandwidth use, and protocol use. Anomaly detection module 214 may look at aggregate network data on service provider network 240 or may look at individual subscribers, such as data originating from subscriber network 244.

Figure 5:
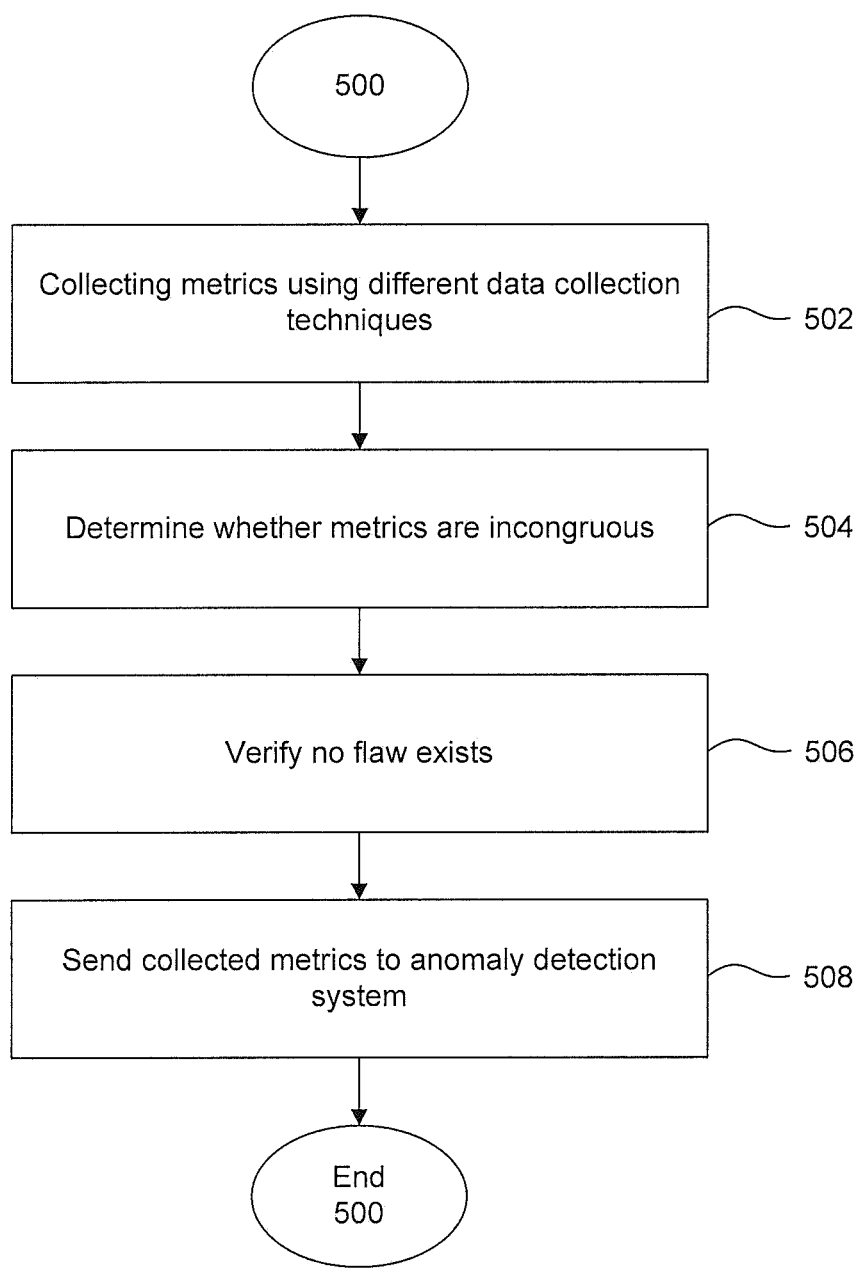
FIG. 5 is a flowchart illustrating a method for collecting network metrics and correlating them to detect flaws in the network, according to an embodiment.

FIG. 5 is a flowchart illustrating a method 500 for collecting network metrics and correlating them to detect flaws in the network, according to an embodiment.

Method 500 begins at step 502. At step 502, metrics are collected using different data collection techniques. The data collection techniques may utilize different data sources. The metrics, collected using different techniques, describe a common characteristic of a network interface. The network may be a port on an edge network element. The characteristic may be utilization of a circuit connected to the port during a period of time. The metrics may be collected for a plurality of time periods, e.g. five minute intervals.

At step 504, collected metrics are compared to determine whether they are incongruous. Step 504 may involve comparing metrics collected using different techniques during the same time and aggregating the resulting data. It may involve calculating a correlation coefficient, a mean ratio between the metrics, and a variance of the ratio between the metrics.

At step 506, the compared data is verified to determine whether any flaw exists. When the first and second metrics are determined to be incongruous at step 504, a flaw is detected to exist in the first or second network data collection techniques.

Finally, at step 508, when no flaws are detected at step 506, at least some of the collected metrics are provided to an anomaly detection system to use to determine whether the network is being attacked.

CONCLUSION

Each of the servers and modules in FIG. 2 may be implemented in hardware, software, firmware, or any combination thereof.

Each of the servers and modules in FIG. 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for comparing different metrics from different data flows to detect a network operational fault in a network, comprising:
   collecting a first metric from a first data flow, wherein the first metric describes a first network characteristic of a first network interface, and wherein the first metric is collected using a first network data collection technique that collects Netflow information;
   collecting a second metric from a second data flow, wherein the second metric describes a second network characteristic of a second network interface, and wherein the second metric is collected using a second network data collection technique different from the first network data collection technique and includes a Simple Network Management Protocol command;
   comparing the collected first metric to the collected second metric;
   in response to the comparing, determining the first metric and the second metric are incongruous metrics indicating the first network interface associated with the first metric is different from the second network interface associated with the second metric;
   determining that a network operational fault exists in the network due to the determining that the first and second metrics being incongruous metrics; and
   in response to determining that the network operational fault exists in the network, providing the first metric to an anomaly detection system to use to determine whether the network is being attacked.

2. The method of claim 1, wherein the first network interface is a port on an edge network element and the first network characteristic of the first network interface is utilization of a circuit connected to the port during a period of time.

3. The method of claim 2, wherein the collecting using the first network data collection technique includes collecting a first plurality of first metrics, each first metric of the first plurality of first metrics describing the utilization of the circuit at a different time period,
   wherein the collecting using the second network data collection technique includes collecting a second plurality of second metrics, each second metric of the second plurality of second metrics describing the utilization of the circuit at a respective different time periods,
   wherein the comparing of the first metric with the second metric includes comparing the first plurality of first metrics and second plurality of second metrics at the respective different time periods.

4. The method of claim 3, wherein the comparing of the first metric with the second metric includes:
   determining a correlation coefficient between the first plurality of first metrics and the second plurality of second metrics;
   determining whether the correlation coefficient is within a predetermined range; and
   determining that the first plurality of first metrics and second plurality of second metrics are incongruous metrics based at least in part on whether the correlation coefficient is determined not to be within the predetermined range.

5. The method of claim 3, wherein the first network data collection technique is a technique that samples data quantities from packets on the circuit during the period of time.

6. The method of claim 3, wherein the comparing of the first metric with the second metric includes:
   determining a plurality of ratios between each of the first metric of the first plurality of first metrics and the second metric of the second plurality of second metrics for respective time periods;
   aggregating the plurality of ratios determined for a plurality of time periods to generate an aggregated ratio;
   determining whether the aggregated ratio determined is within a predetermined range; and
   determining that the first plurality of first metrics and second plurality of second metrics are incongruous metrics based at least in part on whether the aggregated ratio is determined not to be within the predetermined range.

7. The method of claim 6, wherein the comparing of the first metric with the second metric includes:
   determining a variance of the aggregated ratio determined,
   wherein determining that the first plurality of first metrics and second plurality of second metrics are incongruous metrics based at least in part on the determined variance.

8. The method of claim 1, wherein the providing occurs when the first metric is determined to be congruous with the second metric.

9. The method of claim 1, wherein the determining the first metric and the second metric are incongruous metrics comprises performing a comparison technique between the first metric and the second metric, wherein the comparison technique comprises a scaling distribution evaluation between the first metric and the second metric.

10. A non-transitory program storage device storing a program of instruction that when executed by a computer to perform operations for comparing different metrics from different data flows to detect a network operational fault in a network, the operations comprising:
    collecting a first metric from a first data flow, wherein the first metric describes a first network characteristic of a first network interface, and wherein the first metric is collected using a first network data collection technique that collects Netflow information;
    collecting a second metric from a second data flow, wherein the second metric describes a second network characteristic of a second network interface, and wherein the second metric is collected using a second network data collection technique different from the first network data collection technique and includes a Simple Network Management Protocol command;
    comparing the collected first metric to the collected second metric;
    in response to the comparing, determining the first metric and second metric are incongruous metrics indicating the first network interface associated with the first metric is different from the second network interface associated with second metric;
    determining that a network operational fault exists in the network due to the determining that the first and second metrics being incongruous metrics; and
    in response to determining that the network operational fault exists in the network, providing the first metric to an anomaly detection system to use to determine whether the network is being attacked.

11. The program storage device of claim 10, wherein the first network interface is a port on an edge network element and the first network characteristic of the first network interface is utilization of a circuit connected to the port during a period of time.

12. The program storage device of claim 11, wherein the collecting using the first network data collection technique includes collecting a first plurality of first metrics, each first metric of the first plurality of first metrics describing the utilization of the circuit at a different time period,
    wherein the collecting using the second network data collection technique includes collection a second plurality of second metrics, each second metric of the second plurality of second metrics describing the utilization of the circuit at a respective different time periods,
    wherein the comparing of the first metric with the second metric includes comparing the first plurality of first metrics and second plurality of second metrics at the respective different time periods.

13. The program storage device of claim 12, wherein the comparing of the first metric with the second metric includes:
    determining a correlation coefficient between the first plurality of first metrics and the second plurality of second metrics;
    determining whether the correlation coefficient is within a predetermined range; and
    determining that the first plurality of first metrics and second plurality of second metrics are incongruous metrics based at least in part on whether the correlation coefficient is determined not to be within the predetermined range.

14. The program storage device of claim 12, wherein the first network data collection technique is a technique that samples data quantities from packets on the circuit during the period of time.

15. The program storage device of claim 12, wherein the comparing of the first metric with the second metric includes:
    determining a plurality of ratios between each of the first metric of the first plurality of first metrics and the second metric of the second plurality of second metrics for respective time periods;
    aggregating the plurality of ratios determined for a plurality of time periods to generate an aggregated ratio;
    determining whether the aggregated ratio is within a predetermined range; and
    determining that the first plurality of first metrics and second plurality of second metrics are incongruous metrics based at least in part on whether the aggregated ratio is determined not to be within the predetermined range.

16. The program storage device of claim 15, wherein the comparing of the first metric with the second metric includes:
    for each of a respective different time periods, determining a difference between the respective ratio and the aggregated ratio;
    determining a variance between the differences,
    wherein determining that the first plurality of first metrics and second plurality of second metrics are incongruous metrics is based at least in part on the variance determined between the differences.

17. The program storage device of claim 11, wherein the providing occurs when the first metric is determined to be congruous with the second metric.

18. A system for comparing different metrics from different data flows to detect a network operational fault in a network, comprising:
    a computing device;
    a first collector module, implemented on the computing device, that collects a first metric from a first data flow, wherein the first metric describes a first network characteristic of a first network interface, and wherein the first metric is collected using a first network data collection technique that collects Netflow information;
    a second collector module, implemented on the computing device, that collects a second metric from a second data flow, wherein the second metric describes a second network characteristic of a second network interface, and wherein the second metric is collected using a second network data collection technique different from the first network data collection technique and includes a Simple Network Management Protocol command; and
    a fault detection module, implemented on the computing device, that compares the collected first metric to the collected second metric, and in response to the comparing, determines the first metric and the second metric are incongruous metrics and, determines that the network is being attacked due to the determining that the first metric and the second metric are incongruous metrics, wherein the incongruous metrics indicates that the first network interface associated with the first metric is different from the second network interface associated with the second metric.

* * * * *